Patented Nov. 12, 1929

1,735,142

UNITED STATES PATENT OFFICE

BERTHA SUGDEN, OF BOSTON, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE

COLLOIDAL SUSPENSION TREATMENT

No Drawing.   Application filed January 20, 1926.   Serial No. 82,621.

The present invention relates to a method for the treatment of solutions or suspensions to render the same homogeneous per se and also homogeneous, for example, with respect to uniformity of its distribution over and adsorption by a surface to which it may be applied.

In the preparation of solutions of various substances (except those of simple constitution and ready and complete solubility in the solvent used) it is found that an absolutely uniform distribution of the solute is seldom if ever attained. This is found to be especially the case with substances having a complex atomic aggregation in the molecule, and with materials which may partially dissolve but subsequently tend to be converted to the solid condition, as by contact with solid surfaces, of reactive or otherwise appropriate characteristics. Residual particles of the initial substance may remain either in their unchanged condition or physically or chemically altered in such manner as to effectively hinder or prevent their ultimate dissolution or dispersion. Such particles may have as nuclei smaller particles of the original substance, or be built up, by accretion of the solute to foreign substances such as dust or the like. On the other hand, they may result from the reaction of soluble substances present, induced for example, by contact with solid surfaces, in the manner hereafter to be explained. Other properties of the solution and the materials from which it is prepared, as well as the conditions to which it is subsequently subjected, may contribute to this result, as will be readily appreciated by those skilled in the several arts in which these or analogous circumstances may be encountered.

Such lack of precise uniformity, since it is due to relatively minute centers of concentration or reactivity, and may be of the order of colloidal dimensions, is ordinarily not made manifest by the uses to which the solutions in which it occurs are to be put. These particles may not be of sufficient proportions or density to segregate from the solution upon standing and they may be non-detectable by any ordinary method of examination. In cases where the particles are of such nature as to remain in suspension, the solution as an aggregate will be apparently uniform, since the average total of the solute in one volume will be equal to the average total of solute in another volume, and hence the solution may be considered uniform. But such uniformity is of average values only and does not indicate continuous uniformity.

For example, in the preparation of solutions of certain soluble dyes, it is common practice to triturate the dye substance with a small amount of water until it is reduced to a smooth or fluid paste, to then add an increased amount of water and stir the whole mixture thoroughly, sometimes with the addition of a peptizing agent such as acetic acid. The resulting solution is apparently uniform and a true solution, so far as a careful examination will disclose the character of association of its constituents.

However, if this solution is now employed for printing purposes and applied to an embossed die or similar surface which it is adapted to wet, and then transferred, as by impressing the wet die upon the surface to be printed, it is found that while a substantially complete transfer of the absorbed dye on the die is effected, nevertheless a small proportion remains upon the die surface. The absolute amount of the dye thus left is very small, but selective, and by accumulation from numerous impressions, the quantity increases to such an extent as to render subsequent impressions more and more indistinct and imperfect.

This effect is especially emphasized in those instances where the die surface is highly adsorptive or superficially permeable, and also where the intensity and definition of the transferred imprint is of importance. Both of these factors are of outstanding prominence in the process of preparing motion picture films by distributing a dye or coloring solution upon a selectively adsorptive surface (such as a developed and hardened photographic film) removing any excess from the non-adsorptive areas, and impressing the thus wet film upon a second film to be imprinted therewith. The dye is thus transferred from the first film to the second film substantially completely. The first few imprints thus made will leave the matrix almost completely free from accumulations, but gradually the selectively adsorptive areas will retain and accumulate certain portions of the dye which tends to obscure definition in the imprints and also to change the color values of the dye, not only in the imprints corresponding to such portions of the matrix surface but also in the dye solution from which the matrix is wet.

Accordingly, it is an object of this invention to provide a method of treating liquid solutions or suspensions which may contain or be susceptible to the formation of nuclei or minute local concentrations of the solute or dispersoid solids, whereby such nuclei or particles may be certainly and completely removed, or prevented from subsequent formation. A further object is to provide such treatment that the uniformly and permanently distributed solids or solute shall not be thereby chemically altered or removed from the solution and that the treated solution shall not be otherwise appreciably modified.

In general, the method includes an addition to the solution to be treated, of an inert colloid, characterized by free miscibility with or solubility in the solution and susceptibility to subsequent separation therefrom (preferably without the addition of a chemical reagent), thoroughly mixing the thus treated solution, and finally separating, as by coagulating, and removing the reactant colloid, together with the solid particles or liquid components of the solution, susceptible to agglomeration (for example, upon contact with the gelatinous matrix surface) which have become physically entrained or chemically associated therewith.

A further characterization of colloids suitable for use in the invention, is that they shall manifest a selective attraction for the solid particles or other constituents susceptible to aggregation, in the solution, but preferably without concurrent adsorption of or reaction with the dissolved solute or uniformly dispersed colloidal particles, in the case of suspensions.

To this end, a typically satisfactory class of colloids for the purpose of the invention is that including substances of colloidal nature which are amphoteric with respect to their characteristic properties and which are hence susceptible of attraction to and of a certain measure of chemical reaction with other substances of either basic or acidic constitution and having either a positive or negative electrical charge. This class of substances includes for example, albumens, gelatin, casein, etc. and the term "ampholytoids" has been proposed to designate them as being like the amphoteric electrolytes.

It is usually desirable and, in the specific instance to be described, practically essential that the colloid shall be capable of being rendered substantially entirely insoluble and separable from the solution. This may be readily effectuated chemically by the addition of various coagulating reagents, or by physical transformation, as is well known. For the present purposes, chemical coagulation is preferably to be avoided on account of the possible side reactions which the coagulant may manifest with respect to the solution under treatment apart from coagulation per se. Physical alterations in the solution may also be undesirable for a similar reason, but there are many colloidal substances available which may be coagulated by a but slight alteration of conditions, as by electrical discharge, or by heating. The latter is of course, when practicable, the simplest.

A representative and preferred application of the invention will be described with respect to the treatment of dye solutions used for the coloring or printing of moving picture films and the like.

For this purpose, a dye or dye mixture such as that indicated by the following formula may be employed:

|  | Per cent |
|---|---|
| Kuttroff Agalma black 10 Bx | 3.0 |
| Wool orange A | 1.5 |
| Wool orange R | 1.6 |

This is first rubbed into the condition of a smooth paste with hot water.

The paste is then diluted and stirred thoroughly with boiling water and 5% of acetic acid. The resulting solution is preferably allowed to cool.

Unfermented egg albumen is then dissolved in cold water and the resulting solution or colloid is added to the dye solution, the two liquids being thoroughly mixed in any suitable manner. The resulting mixture or solution may merely be permitted to stand, whereupon the egg albumen gradually separates and coagulates, entraining therewith all solid particles and also those constituents which are susceptible to subsequent solidification, which may initially be dissolved in the solution. However, this is preferably and more rapidly accomplished by boiling the mixture, which coagulates the egg and renders it insoluble, thus throwing it down in a consolidated mass which is then easily removed, as by filtering or decanting the supernatant liquor.

The dye solution thus treated may now be applied to the developed film matrix, from which, upon subsequent contact with the film to be printed, it will be essentially completely transferred to the latter without leaving any accumulative residue on the matrix. Consequently repeated imprints may be drawn from the same matrix simply by rewetting the surface with the thus treated dye solution, removing the surplus and then contacting with the fresh surfaces of films, or the like, to which they are to be applied. In practice, it is found that the number of such imprints is not limited, as formerly, by the serious clogging of the die matrix with residual dye accumulations and consequent loss of definition and inaccuracy and confusion of color values, but only by the physical deterioration by wear upon the matrix itself, resulting in scratches and other irregularities in the printing surface, which necessitate its being discarded.

In those cases where complementary colors are to be superimposed for the purpose of giving secondary or shaded effects, the particular value of the present process is especially apparent, because while such irregularities as are caused by untreated dye solutions in a single-color film result in a variation in intensity,—when such irregularities occur in superposed colors there is a variation in color values also which will usually be entirely out of harmony with the subject represented and give a highly displeasing result.

If one of several dyes in a mixture is especially subject to the presence of solid particles, it may be found advantageous to treat this dye solution, prior to its addition to the remaining constituents of the mixture to be used, which in some instances may not require any treatment in order to be entirely satisfactory for use.

It will be readily appreciated that this invention lends itself to numerous and widely diversified applications in commercial practice, and that various modifications and adaptations of the same may and ordinarily will be made, for its more convenient utilization under specific conditions and with respect to the individual characteristics of the reagent materials employed and treated. Such modification and adaptations of the invention are, however, to be considered as comprehended by the above disclosure and included within the terms of the following claims.

I claim:

1. A process for the treatment of non-homogeneous dye solutions containing semisolids or liquids susceptible to subsequent aggregation upon gelatinous films, comprising intermingling an albuminous colloid therewith, capable of reacting with the semisolid matter and thereafter effecting such reaction, coagulating and selectively segregating said colloid and associated matter from the liquid.

2. A process for the treatment of non-homogeneous dye solutions, containing semi solids or liquids susceptible to subsequent aggregation upon gelatinous films, comprising mixing albumen therewith, in the cold, agglomerating said albumen by heat, and segregating the agglomerated albumen and matter associated therewith from the liquid.

3. A process for the treatment of non-homogeneous dye solutions or suspensions, comprising mixing an amphoteric colloid therewith, and subsequently agglomerating said colloid and separating the same with associated matter from the solution.

4. A process for the treatment of non-homogeneous dye solutions or suspensions, comprising mixing an amphoteric colloid characterized by being soluble therein, and subsequently agglomerating said colloid and separating the same, with associated matter, from the solution.

5. A process for the preparation of uniform dye solutions from solutions initially containing semisolid or liquid impurities subject to agglomeration, which comprises the step of treating the same with a colloid freely miscible and inert with respect to the dissolved dye and reactive to combine with said impurities and thereafter coagulating and separating said colloid from the dye solution.

6. A process for the preparation of uniform dye solutions from solutions initially containing semisolid or liquid impurities subject to agglomeration, which comprises the step of treating the same with an albumen freely miscible and inert with respect to the dissolved dye and reactive to combine with said impurities and thereafter coagulating and separating said colloid from the dye solution.

7. A process for the preparation of uniform acid dye solutions from solutions initally containing semisolid or liquid impurities subject to agglomeration, which comprises the step of treating the same with a colloid freely miscible and inert with respect to the dissolved dye and reactive to combine with said impurities and thereafter coagulating and separating said colloid from the dye solution.

Signed by me at Boston, Massachusetts, this 17th day of December, 1925.

BERTHA SUGDEN.